United States Patent
Rakshit

(10) Patent No.: US 11,969,950 B2
(45) Date of Patent: Apr. 30, 2024

(54) ADDITIVE MANUFACTURING BY LIGHT-EMITTING MICRO DEVICES IN PHOTOSENSITIVE MATERIAL

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 18/138,272

(22) Filed: Apr. 24, 2023

(65) Prior Publication Data

US 2023/0256681 A1 Aug. 17, 2023

Related U.S. Application Data

(63) Continuation of application No. 16/925,620, filed on Jul. 10, 2020, now Pat. No. 11,691,344.

(51) Int. Cl.
- *B33Y 30/00* (2015.01)
- *B29C 64/135* (2017.01)
- *B29C 64/264* (2017.01)
- *B29C 64/393* (2017.01)

(Continued)

(52) U.S. Cl.
CPC .......... *B29C 64/393* (2017.08); *B29C 64/135* (2017.08); *B29C 64/264* (2017.08);
(Continued)

(58) Field of Classification Search
CPC ... B29C 64/264; B29C 64/106; B29C 64/393; B33Y 10/00; B33Y 50/02
See application file for complete search history.

(56) References Cited

U.S. PATENT DOCUMENTS

| 9,950,465 B2 * | 4/2018 | Linnell ................ B33Y 30/00 |
| 2015/0307385 A1 | 10/2015 | Klein |

(Continued)

FOREIGN PATENT DOCUMENTS

| CN | 107199701 A | 9/2017 |
| JP | 61120712 | * 6/1986 |

(Continued)

OTHER PUBLICATIONS

England, "Researchers find a way to 3D print whole objects in seconds", Feb. 13, 20, engadget, 9 pps., <https://www.engadget.com/2020/02/13/3d-print-whole-objects-seconds-resin/>.

(Continued)

*Primary Examiner* — Alison L Hindenlang
*Assistant Examiner* — Debjani Roy
(74) *Attorney, Agent, or Firm* — Michael A. Petrocelli

(57) ABSTRACT

An apparatus, method, and computer program product. The embodiments include a method for three-dimensional printing of an object. The method provides for one or more processors to receive image data of an object to print. The one or more processors receive a position of a light-emitting robot inserted within photosensitive material. The one or more processors initiate movement of the light-emitting robot within the photosensitive material. The one or more processors control navigation of the light-emitting robot through the photosensitive material, based on continual feedback of the position of the light-emitting robot within photosensitive material and the received image data of the object to print, and the one or more processors control activation and deactivation of emitted light of the light-emitting robot, based on the image data of the object to print, wherein the emitted light of the light-emitting robot solidifies the photosensitive material.

20 Claims, 4 Drawing Sheets

(51) Int. Cl.
    *B33Y 10/00*        (2015.01)
    *B33Y 50/02*        (2015.01)
(52) U.S. Cl.
    CPC .............. *B33Y 10/00* (2014.12); *B33Y 30/00*
                       (2014.12); *B33Y 50/02* (2014.12)

(56)            References Cited

U.S. PATENT DOCUMENTS

2018/0071982 A1    3/2018   Linnell
2018/0153205 A1    6/2018   Wu
2021/0353772 A1    11/2021  Sitti

FOREIGN PATENT DOCUMENTS

JP          61120712 A     6/1986
WO          2019169960 A1  9/2019

OTHER PUBLICATIONS

IBM: List of IBM Patents or Patent Applications Treated as Related. Filed Herewith. 2 pages.
Kelly et al., "Volumetric additive manufacturing via tomographic reconstruction", Science, AAAS, Mar. 8, 2019: vol. 363, Issue 6431, pp. 1075-1079,<https://science.sciencemag.org/content/363/6431/1075>.
Sher, "More details emerge on UC Berkeley—LLNL new CAL volumetric 3D printing", Feb. 1, 2019, 3dpbm, 7 pps., <https://www.3dprintingmedia.network/more-details-emerge-on-uc-berkeley-llnl-new-cal-volumetric-3d-printing-method/>.
U.S. Appl. No. 16/925,620, filed Jul. 10, 2020.

* cited by examiner

ADDITIVE MANUFACTURING BY LIGHT-EMITTING MICRO DEVICES IN PHOTOSENSITIVE MATERIAL

FIELD OF THE INVENTION

The present invention relates generally to the field of additive manufacturing, and more particularly to three-dimensional printing by control of light-emitting maneuverable devices inserted into photosensitive material.

BACKGROUND OF THE INVENTION

Additive manufacturing includes an industry of processes and technologies that join materials to produce objects from three-dimensional (3D) image data of a model. A prevalent technique of additive manufacturing is referred to as 3D printing and includes building an object by deposition of material layer-by-layer, using materials available in fine powder form. Deposition of material layers is controlled by data from image scanning of the object, which includes shape and dimensions that are used to reproduce copies of the object.

Computed axial lithography (CAL) is an additive manufacturing technique that improves some of the constraints of layer-by-layer 3D printing, such as speed, geometry, and surface quality. Photosensitive material is often in the form of a liquid or viscus gel, and reacts with certain wavelengths of light causing the material to solidify. CAL techniques build a 3D object by rotation of a transparent container of photosensitive material and simultaneously projecting a light source into the material representing a slice-image of the object. As the container rotates, the light projection changes to represent a next slice-image of the object. The projected light reacts with the photosensitive material causing the material to solidify. After the full rotation of the container, the 3D object build is complete.

SUMMARY

Embodiments of the present invention disclose an apparatus, computer-implemented method, and a computer program product for three dimensional printing. The apparatus includes:
a computing device component configured to receive 3D image data from a 3D scan of an object;
a light-emitting robot having a fluid dynamic shape and constructed, at least in part, with ferrous metal capable of being directed by a magnetic field and material capable of reflecting light or sound waves, wherein the light-emitting robot includes a light source of a wavelength capable of solidifying a photosensitive material, and the light-emitting robot including a power source and control for activating the light source;
a container of a size and shape to contain the photosensitive material;
an array of magnetic field generating devices positioned around the container such that one or more of the magnetic devices are activated navigate the light-emitting robot throughout the photosensitive material;
a controller configured to receive 3D image data from scanning of an object and transpose the 3D image data into an aggregate of pixelated layers, wherein the controller receives position data of the light-emitting robot within the photosensitive material, and activates the array of magnetic field generating devices to navigate the light-emitting robot through the photosensitive material, based on the pixelated layers of the 3D image data, and wherein the controller activates the light source by wireless communication to solidify the photosensitive material corresponding to the pixelated data layers of the 3D image data from the scanning of the object; and
a monitoring device detecting the relative position of the light-emitting robot within the photosensitive material by sensing reflective waves on three axis and sending the relative position to the controller as feedback for navigation.

Embodiments of the present invention also include a computer-implemented method and a computer program product for three-dimensional printing of an object. The computer program product includes program instructions stored on at least one computer-readable storage medium, the program instructions causing a processor set to perform the the computer-implemented method steps receive 3D image data from a scan of an object to print. The processor transposes the 3D image data into an aggregate of layers of pixelated data. The processor receives an initial position of a light-emitting robot inserted within photosensitive material. The processor navigates the light-emitting robot through the photosensitive material, based on the aggregate of layers of pixelated data of the object scan and feedback of a position of the light-emitting robot within photosensitive material. The processor activates light emission from the light-emitting robot, based on the wireless communication with the light-emitting robot and the position of the light-emitting robot within the photosensitive material corresponding to the aggregate of layers of the pixelated data of the 3D image data, wherein the light emission of the light-emitting robot solidifies the photosensitive material.

DETAILED DESCRIPTION

Embodiments of the present invention recognize that additive manufacturing techniques used to print a 3D object by projecting light into photosensitive material are limited by the size and thickness of the object to be printed. Embodiments further recognize that light penetration into photosensitive materials will initiate solidification of the material more quickly at the outer regions, resulting in incomplete curing of the materials towards the center of the object. The limitation of light penetration into photosensitive materials limits the size and shape of objects that can be produced by Computed axial lithography (CAL) techniques, limiting the realized benefits to printing of small objects.

Embodiments of the present invention provide a method, computer program product, and computer system for three-dimensional (3D) printing using maneuverable light-emitting robotic devices inserted in photosensitive material. In some embodiments of the present invention, one or more miniaturized devices, enabled with light emitting components, are inserted into photosensitive material and are maneuvered within the photosensitive material in a controlled and/or instructed pattern. The one or more photo robots receive wireless signals initiating light emitting functions within the photosensitive material, based on received 3D image data of an object to build using a 3D printing technique, also referred to herein as a/the object to print or object to be printed. The emitted light is of a wavelength that solidifies the photosensitive material in the immediate area of the emitted light.

In some embodiments, the one or more photo robots are maneuvered by an array of external devices producing magnetic fields that direct the ferrous components of the photo robots in a predefined pattern, and the emitted light is controlled to solidify the photosensitive material in a pattern duplicating the object. The light emitting miniaturized devise are referred to, herein, as photo robotic devices, or photo robots for short.

Embodiments of the present invention provide techniques for 3D printing of larger objects having dimensions that prevent photolithographic building from light sources external to the photosensitive material. In some embodiments, the light emitting function of the photo robots includes an array of light sources capable of providing multi-directional sources of light, and controlling the intensity and focus of emitted light. In some embodiments, a photo robot includes a microprocessor and components capable of receiving wireless instructions for light emission control. In some embodiments, a photo robot includes components to receive power wirelessly, such as from microwaves, inductive coupling, or laser light of a wavelength not reactive to the photosensitive material. In other embodiments, a photo robot includes a rechargeable battery as a power supply to power light emission and maneuverability.

Figure 1:
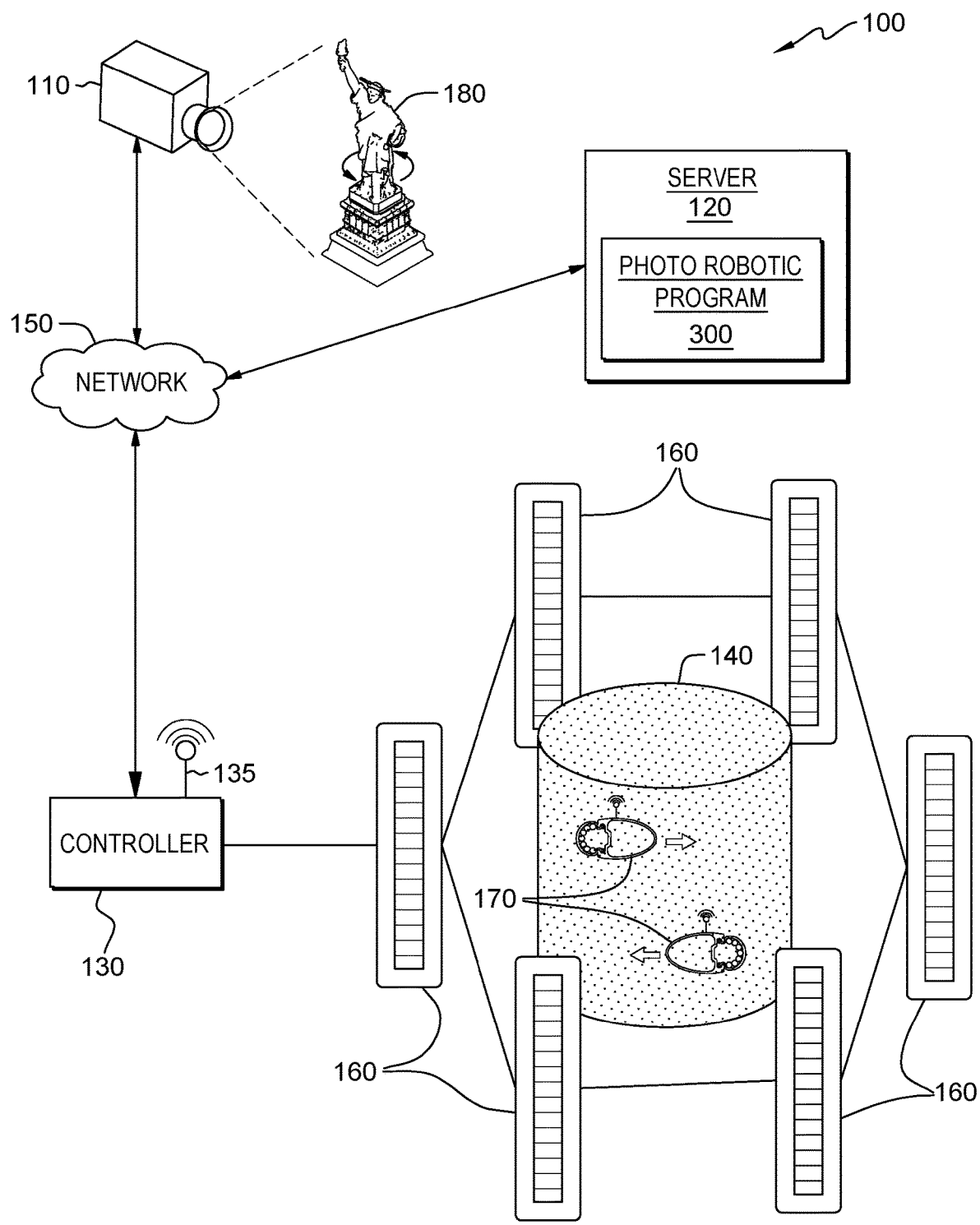
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes scanning device 110, server 120, controller 130, wireless transmitter 135, all interconnected via network 150, as well as material container 140, magnetic array 160, photo robots 170 and print object 180. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communications between scanning device 110, server 120, wireless transmitter 135, and controller 130, in accordance with embodiments of the present invention.

Scanning device 110 is a photo imaging scanner that generates image data of print object 180 that includes the three-dimensional profile and dimensional data of print object 180. In some embodiments, scanning device 110 performs a scan of print object 180 by maneuvering print object 180 to present all three-dimensional aspects of print object 180. In other embodiments, scanning device 110 is maneuvered to scan all three-dimensional aspects of print object 180. In some embodiments, scanning device 110 generates a plurality of scanning images in which each image represents a surface of print object 180. As scanning advances to adjacent portions of the surface of print object 180, image data is aggregated to result in a compilation of three-dimensional data. In some embodiments, image data is reduces to an array of pixels, and the pixels contain data values that correspond to physical features of print object 180. The aggregated data is received by photo robotic program 300 on server 120.

Controller 130 receives input from photo robotic program 300 to control the movement of photo robots 170 traversing the photosensitive material contained in container 140. In some embodiments of the present invention, controller 130 also transmits the received input from photo robotic program 300 to control the light emission from the trailing ends of photo robots 170 via wireless transmitter 135. In some embodiments, controller 130 is connected to magnetic array 160 and controls movement of photo robots 170 by dynamically adjusting magnetic fields of magnetic array 160, based on the received input from photo robotic program 300. Controller 130 monitors the respective positions of photo robots 170 within material container 140 and sends the respective positions to photo robotic program 300, and receives input indicating movement of photo robots 170 corresponding to generating a duplicate of print object 180. In an example embodiment, the respective positions of photo robots 170 are determined by the refection of laser light on three axis (not shown), such that the laser light is of a wavelength that does not react with photosensitive material 145. In another example embodiment, the respective positions of photo robots 170 are determined by use of ultrasonics (not shown).

Material container 140 is depicted as a cylindrical shape and contains photosensitive material 145. Material container 140 is positioned within magnetic array 160 such that movements of photo robots 170 are controlled by dynamically adjusting magnetic fields from magnetic array 160 interacting with ferrous components of photo robots 170. In some embodiments, material container 140 has a shape and size to accommodate building of a duplicate of print object 180 within the photosensitive material of material container 140. Material container 140 includes photosensitive material 145 which, in some embodiments, is a synthetic acrylate polymer, such as a gelatin state of methacrylate hydrogel.

Magnetic array 160 is a plurality of devices that produce a close-range magnetic field external to material container 140. Magnetic fields generated by magnetic array 160 are controlled by input received from photo robotic program 300 by controller 130. Magnetic array 160 produces magnetic fields that interact with ferrous components of photo robots 170 and control the direction and velocity of photo robots 170.

Photo robots 170 are miniaturized devices that are inserted in photosensitive material 145 of material container 140 and traverse photosensitive material 145 based on magnetic fields generated by magnetic array as controlled by input received from photo robotic program 300 via controller 130. In some embodiments of the present invention, photo robots 170 include ferrous material that reacts to a magnetic field, producing movement and controlling direction and velocity of photo robots 170. FIG. 1 depicts a pair of photo robots as photo robots 170. In some embodiments, the quantity of photo robots 170 inserted into photosensitive material 145 is based on the size of print object 180, including a larger quantity of photo robots for a larger object to print. In other embodiments, a single photo robot may be utilized to exercise finer control over detail associated with printing of an object.

Photo robots 170 include a light emission source positioned at a trailing end and configured to control attributes of the emitted light, such as direction, intensity and focus. Photo robots 170 include a microprocessor and a transmission receiver to receive and process signals initiating light emission. Photo robots 170 receive wireless signals from controller 130, which receives input from photo robotic program 300. The wireless signals received by photo robots 170 control activation and deactivation of light emission, as well as direction, and focus of the emitted light. In some embodiments, photo robots 170 receive wireless transmission of power for light emission, such as from microwaves, inductive coupling, or laser light of a wavelength not reactive to the photosensitive material. In other embodiments, a photo robot includes a rechargeable battery to power light emissions, and in yet other embodiments, the rechargeable battery provides power to photo robots 170 for maneuverability. Discussion of FIG. 2 includes additional details of photo robots 170.

Print object 180 represents a larger object intended for duplication by photosensitive material techniques. Current techniques of 3D printing by photosensitive material techniques are limited to producing small "centimeter sized" objects due to external emission of light sources solidifying the outer regions of photosensitive material in a container prior to material in a central region completing solidification. Embodiments of the present invention enable duplication of print object 180 by inserting photo robots 170 within photosensitive material 145 and generating light emissions from the trailing ends of photo robots 170 to solidify photosensitive material 145.

Server 120 is depicted as connected to scanning device 110 and controller 130 via network 150, and including photo robotic program 300. In some embodiments of the present invention, server 120 represents a virtual computing device operating across multiple computers as a server system, such as in a cloud computing environment, and provides access and connectivity of client device 110 to authentication program 300 and other function and resources residing on server 120, via network 150.

In some embodiments, server 120 can be a web server, a blade server, a desktop computer, a laptop computer, a tablet computer, a netbook computer, or any other programmable electronic computing device capable of receiving, sending, and processing data, and communicating with scanning device 110 and controller 130, and other computing devices (not shown) within distributed data processing environment 100 via network 150. In another embodiment, server 120 represents a computing system utilizing clustered computers and components (e.g., database server computers, application server computers, etc.) that act as a single pool of seamless resources when accessed within distributed data processing environment 100. Server 120 may include internal and external hardware components, as depicted in more detail and described in FIG. 4.

Photo robotic program 300 is depicted as hosted and operating from server 120. In example embodiments of the present invention, photo robotic program 300 receives image data of print object 180 from scanning device 110. The image data received by photo robotic program 300 is transposed into 3D data representing aggregate slices or layers of the scans taken of print object 180 by 3D printing techniques. Photo robotic program 300 sends instruction to controller 130 including position, direction, and movement of photo robots 170, and instruction for activation and deactivation of lights within light emitting arrays of photo robots 170.

In some embodiments, photo robotic program 300 includes instruction for magnetic array 160, executed by controller 130, and receives respective positions of photo robots 170 based on detection data received by controller 130 and sent to photo robotic program 300 as feedback. In other embodiments, photo robotic program 300 sends position, direction, and velocity instruction to controller 130 and, in response, controller 130 adjusts the magnetic fields of magnetic array 160 to attain the instructed position, direction and velocity of photo robots 170. In some embodiments, photo robotic program 300 sends controller 130 instructions for activation and deactivation of the light arrays of photo robots 170 as well as instruction to control direction, focus, intensity, and duration of emitted light, solidifying the photosensitive material in positions corresponding to the profile and dimensions of print object 180.

Figure 2A:
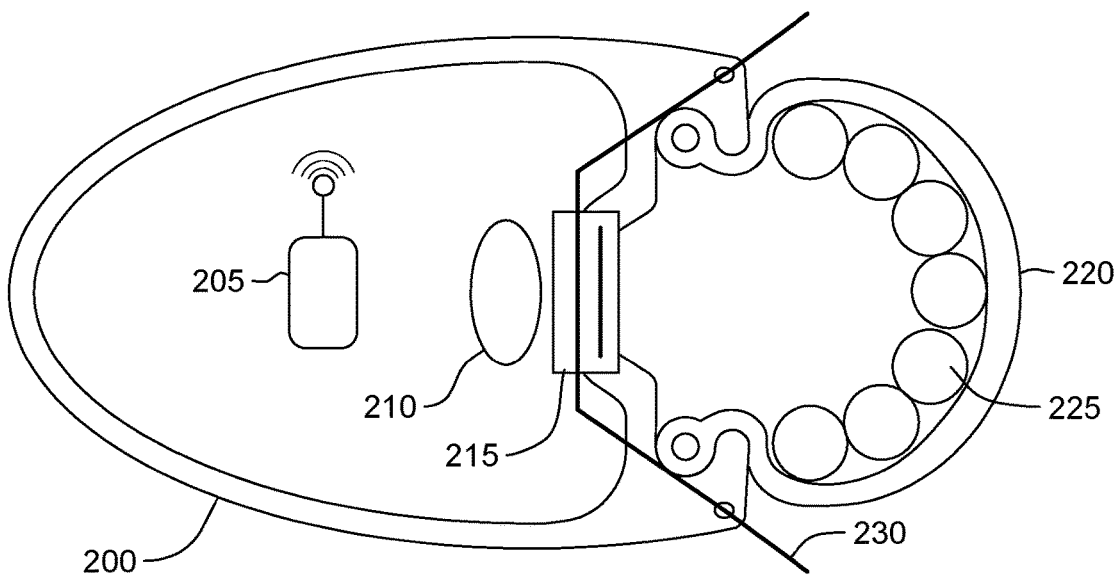
FIG. 2A is a diagram depicting details of a light emitting photo robot 200, in accordance with embodiments of the present invention.

FIG. 2A is a diagram depicting details of a light emitting photo robot 200, in accordance with embodiments of the present invention. In one embodiment of the present invention, photo robot 200 includes microprocessor and transceiver 205, power source 210, optional propulsion motor 215, propulsion arm 230, light array 220, and individual light 225.

Microprocessor and transceiver 205 enables photo robot 200 to receive wireless instruction from photo robotic program 300 via controller 130, controlling the emission of light from light array 220. Microprocessor and transceiver 205 receive signals to activate and deactivate lights within light array 220 in a pattern consistent with solidification of photosensitive material to generate a three-dimensional object. In some embodiments, microprocessor and transceiver 205 are separate components of photo robot 200 (not shown). In some embodiments, photo robot 200 operates autonomously, based on microprocessor and transceiver 205 receiving and processing wireless control instructions to maneuver photo robot 200 within the photosensitive material by operating propulsion motor 215 to engage propulsion arm 230.

In some embodiments of the present invention, the structural shape of photo robot 200 is elliptical or other fluid-dynamic shape enabling photo robot 200 to move through the photo sensitive material with minimal resistance. In some embodiments, the anterior portion of photo robot 200 includes a magnetic material, such as iron, nickel, cobalt or alloys of rare earth metals. The magnetic component enables propulsion and navigation control of photo robot 200 by close-range magnetic fields, such as those produced by controller 130 operating magnetic array 160 (FIG. 1). In other embodiments, photo robot 200 includes propulsion motor 215 and propulsion arm 230 enabling self-powered movement of photo robot 200 through the photosensitive material. In embodiments of the present invention, the velocity of photo robot 200 is based on a property of the reactive rate of the photosensitive material to the emitted light and includes light intensity as an additional factor.

In one embodiment power source 210 provides power for microprocessor and transceiver 205 and light array 220. In some embodiments, power source 210 includes a rechargeable battery as an autonomous source of power. In still other embodiments, power source 210 receives power wirelessly from an external source.

In some embodiments of the present invention, light array 220 is positioned at the posterior end of photo robot 200, and includes a plurality of individual lights, such as individual light 225, each of which emits light in a designated direction. In some embodiments, individual light 225 is activated and deactivated independent of other lights of light array 220. Light array 220 of photo robot 200 enables multi-directional emission of light within the photosensitive material, and the array structure of light array 220 enables the ability to project both a focused direction of light and a broad distribution of light. In some embodiments, the light emitted by light array 220 is focused by an orifice on light array 220 of the photo robot 200. In some embodiments, light array 220 includes a single high intensity light source, and directional control of emitted light is performed by opening and closing of shutters in light array 220. Embodiments of the present invention include emission of light of a wavelength corresponding to initiating solidification of the photosensitive material, and the rate of solidification is based on the duration of exposure and the intensity of the emission of light within the photosensitive material to the emission of, for example the emission of light from light array 220 may have a wavelength in an ultraviolet range.

Figure 2B:
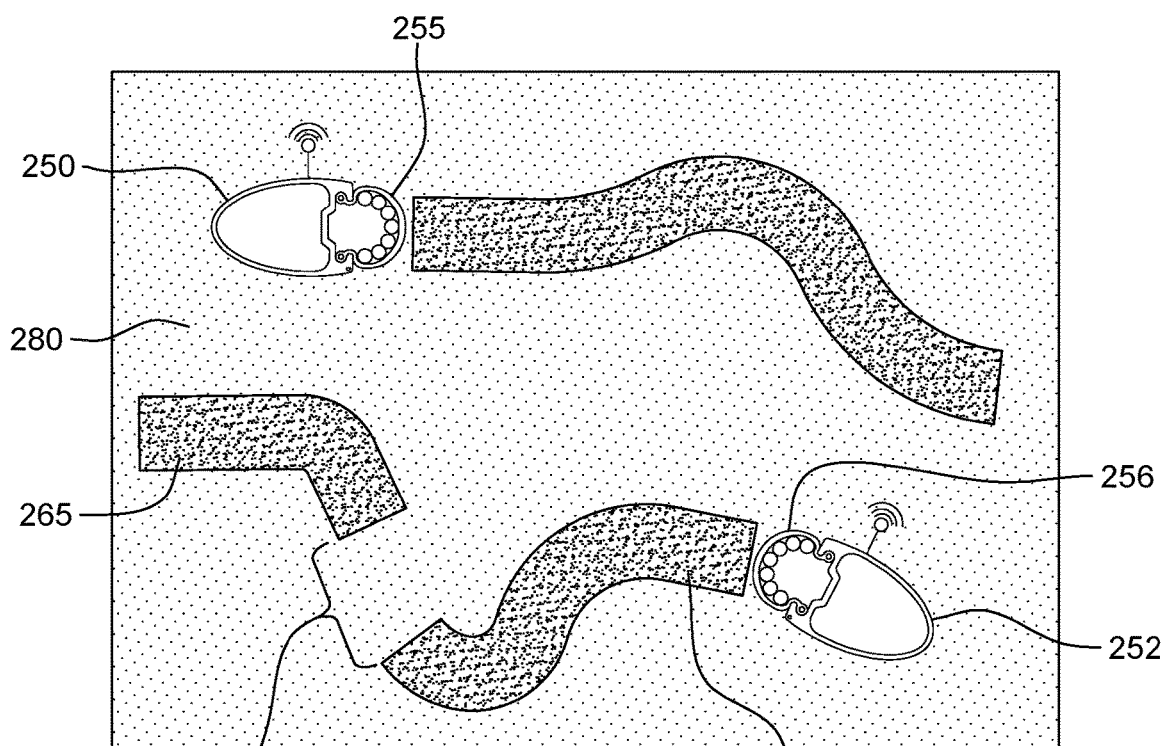
FIG. 2B is a diagram depicting solidification of photosensitive material 280, in accordance with embodiments of the present invention.

FIG. 2B is a diagram depicting solidification of photosensitive material 280, in accordance with embodiments of the present invention. In embodiments of the present invention, photo robot 250 and photo robot 252 are inserted in photosensitive material 280 at an initial position, and a continuous tracking technique provides position information to photo robotic program 300. Photo robotic program 300 activates the emission of light from light array 255 of photo robot 250 and light array 256 of photo robot 252, based on image data corresponding to the object to be printed. Photo robotic program 300 guides the movement of photo robots 250 and 252. While moving, photo robots 250 and 252 receive signals to activate and deactivate the emission of light from light arrays 255 and 256, respectively. In some embodiments, the intensity and focus of emitted light is programmatically controlled by photo robotic program 300. The emission of light from light array 255 creates solidification path 260, and the emission of light from light array 256 creates solidification paths 265 and 270. The deactivation of light from light array 256 of photo robot 252 results in non-solidified section 275, separating solidification paths 265 and 270.

Figure 3:
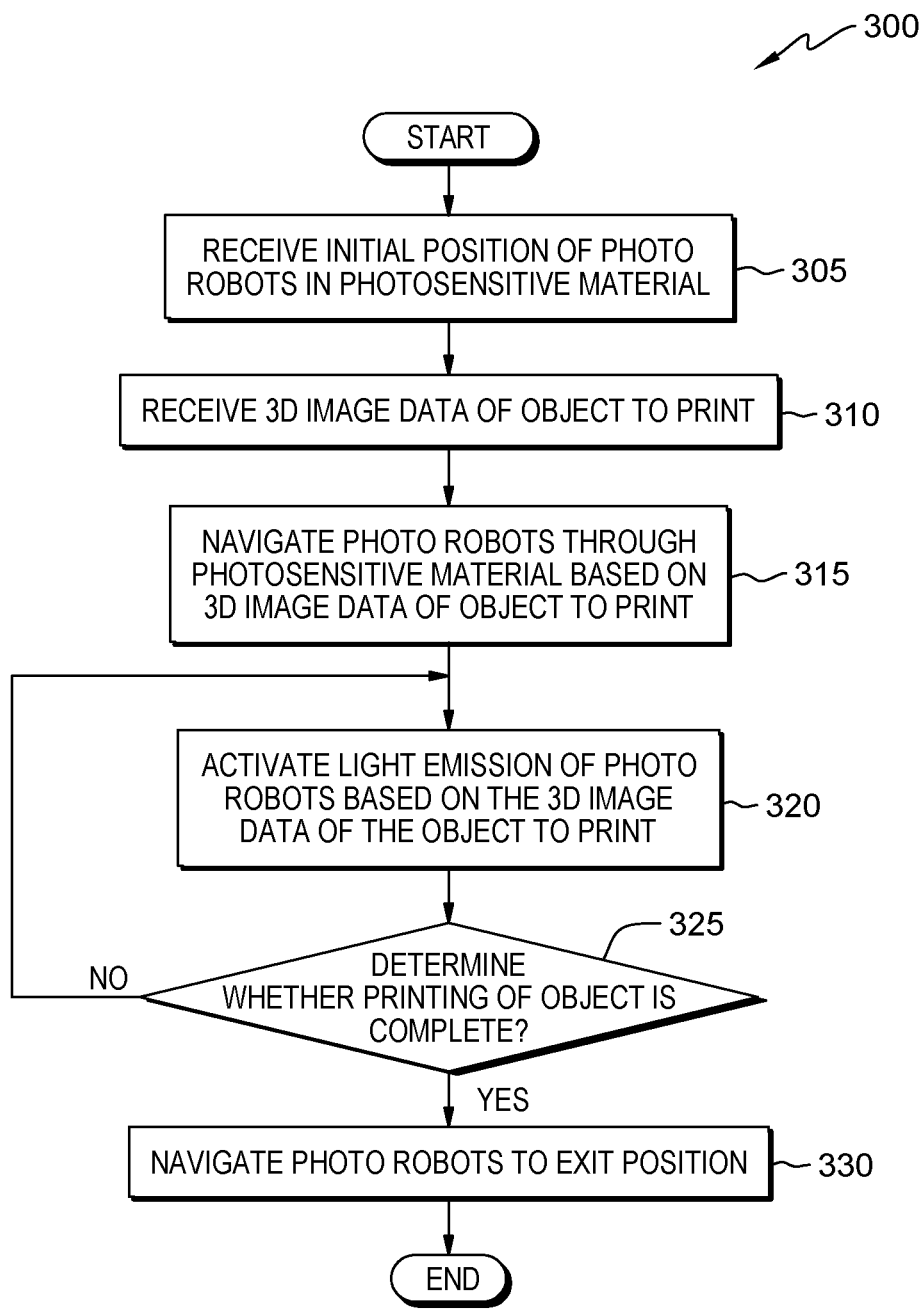
FIG. 3 is a flowchart depicting operational steps of a photo robotic program, operating in the distributed data processing environment of FIG. 1, in accordance with embodiments of the present invention.

FIG. 3 is a flowchart depicting operational steps of a photo-robotic program 300, operating in distributed data processing environment 100 of FIG. 1, in accordance with embodiments of the present invention. In embodiments of the present invention, a container of photosensitive material of size and volume adequate to contain a duplicate of the target item for 3D printing is filled with an appropriate amount of photosensitive material. The photosensitive material is a liquid-gel material having a liquid viscosity allowing traversal of photo robots through the photosensitive material. The photosensitive material reacts to the emission of light of a particular wavelength by solidifying.

Photo robotic program 300 receives the initial position of the photo robots inserted into the photosensitive material (step 305). One or more photo robots are inserted into the photosensitive material. In some embodiments of the present invention, photo robotic program 300 determines the quantity of photo robots and calculates time estimate to print of the object, based on the size, dimensions, and a determination of the volume of the object to print. Photo robotic program 300 generates an instruction indicating the placement of the determined quantity of light-emitting robots into the photosensitive material. In other embodiments, external sources and methods may be used to determine the quantity of photo robots to insert into the photosensitive material.

In some embodiments, the inserted photo robots are placed in a position within the photosensitive material designated as an initial position. In other embodiments, the photo robots are inserted randomly and the starting position of the respective photo robots is detected by a tracking device of controller 130 (FIG. 1) and the respective initial positions are transmitted to photo robotic program 300. In one embodiment, optical sensors of controller 130 track the positions of the photo robots. In another embodiment, sonar-type sensors of controller 130 can track the positions of the photo robots.

Photo robotic program 300 receives 3D image data of the object to print (step 310). Photo robotic program 300 receives the scanned image data of the object to print, and then analyzes and transposes the scanned image data into an aggregate of layers of pixelated data. The data includes positions within the photosensitive material at which the light emissions of the photo robots are activated and positions at which the light emissions are deactivated.

For example, scanning device 110 generates 3D image data of print object 180, which may include rotating or moving print object 180 or movement of scanning device 110 to generate an aggregate three-dimensional image representation of print object 180. Photo robotic program 300 receives the scanned image data of print object 180 from scanning device 110. Photo robotic program 300 analyzes the data and generates pixelated data representing positions within the photosensitive material at which light emissions of photo robots are activated, and positions at which light emissions are deactivated.

Photo robotic program 300 navigates photo robots through the photosensitive material based on the 3D image data of the object to print (step 315). Photo robotic program 300 sends instructions to the photo robot controller to move the photo robots in a designated direction and velocity. In some embodiments, the velocity of navigating photo robots through the photosensitive material is predetermined, based on the solidification rate of the material as the material is exposed to light emissions of a particular wavelength from the photo robots. In some embodiments, the photo robots are moved through the photosensitive material by controlled magnetic fields generated around the container of the photosensitive material acting on magnetic material of the photo robots. Photo robotic program 300 navigates the photo robots in a designated direction and at a designated velocity to build the object to print, based on the received image data of the object.

For example, photo robotic program 300 sends instructions to controller 130 to navigate photo robots 170 in respective designated directions and at a pre-determined velocity. Controller 130 generates magnetic fields from magnetic array 160 to move photo robots 170 in the respective designated directions and velocity. In some embodiments, controller 130 tracks the positions of photo robots 170 and sends the position information to photo robotic program 300 as feedback, and photo robotic program 300 returns instructions to controller 130 based on the received feedback of the positions of photo robots 170. In some embodiments, photo robots 170 include propulsion capability and navigate utilizing received instructions from photo robotic program 300.

Photo robotic program 300 activates light emission of photo robots based on the 3D image data of the object to print (step 320). Photo robotic program 300 navigates the photo robots through the photosensitive material by transmitted instructions of direction and velocity. Additionally, photo robotic program 300 transmits signals to the photo robots to activate and deactivate light emission from the light array component of the photo robots, based on the received image data of the object to print. Photo robotic program 300 activates light from the light array of the photo robots to solidify the photosensitive material at positions corresponding to the structure of the object to print, and deactivates the light array at positions to remain un-solidified, which do not correspond to the structure of the object to print.

Photo robotic program 300 determines whether the printing of the object to print is complete (decision step 325). Photo robotic program 300 continues to transmit instruction to the photo robot controller to move, navigate, and activate light emissions from the photo robots within the photosensitive material. Photo robotic program 300 determines completion of the printing of the object subsequent to the transmission of the received image data of the object to the controller of the photo robots and the feedback that the photo robots have completed the navigation and light activation corresponding to the transmitted instructions.

For the case in which photo robotic program 300 determines that the printing of the object is not complete (step 325, "NO" branch), photo robotic program 300 returns to step 320 and continues to activate light emissions of the photo robots based on the 3D image data of the object to print, and continues as described above.

For the case in which photo robotic program 300 determines that the printing is complete (step 325, "YES" branch), photo robotic program 300 navigates photo robots to an exit position within the photosensitive material (step 330). In some embodiments of the present invention, photo robotic program 300 receives continual feedback regarding the positions of the photo robots within the photosensitive material. Subsequent to determining the printing of the object to be complete, photo robotic program 300 provides instruction to the controller directing the photo robots to a predetermined recovery position within the container of the photosensitive material. Having positioned the photo robots to an exit position, photo robotic program 300 ends.

For example, photo robotic program 300 transmits instructions to controller 130 (FIG. 1) via network 150 directing photo robots 170 within container 140, based on the image data of print object 180, received from scanning device 110. Photo robotic program 300 determines that the printing of the object is complete, based on transmission of the instructions associated with all the received image data of print object 180. Photo robotic program 300 receives position information associated with photo robots 170 from controller 130 and calculates the navigation to direct the photo robots to respective recovery positions. Photo robotic program 300 transmits the instructions to controller 130 to navigate photo robots 170 to the respective recovery positions, and ends.

Figure 4:
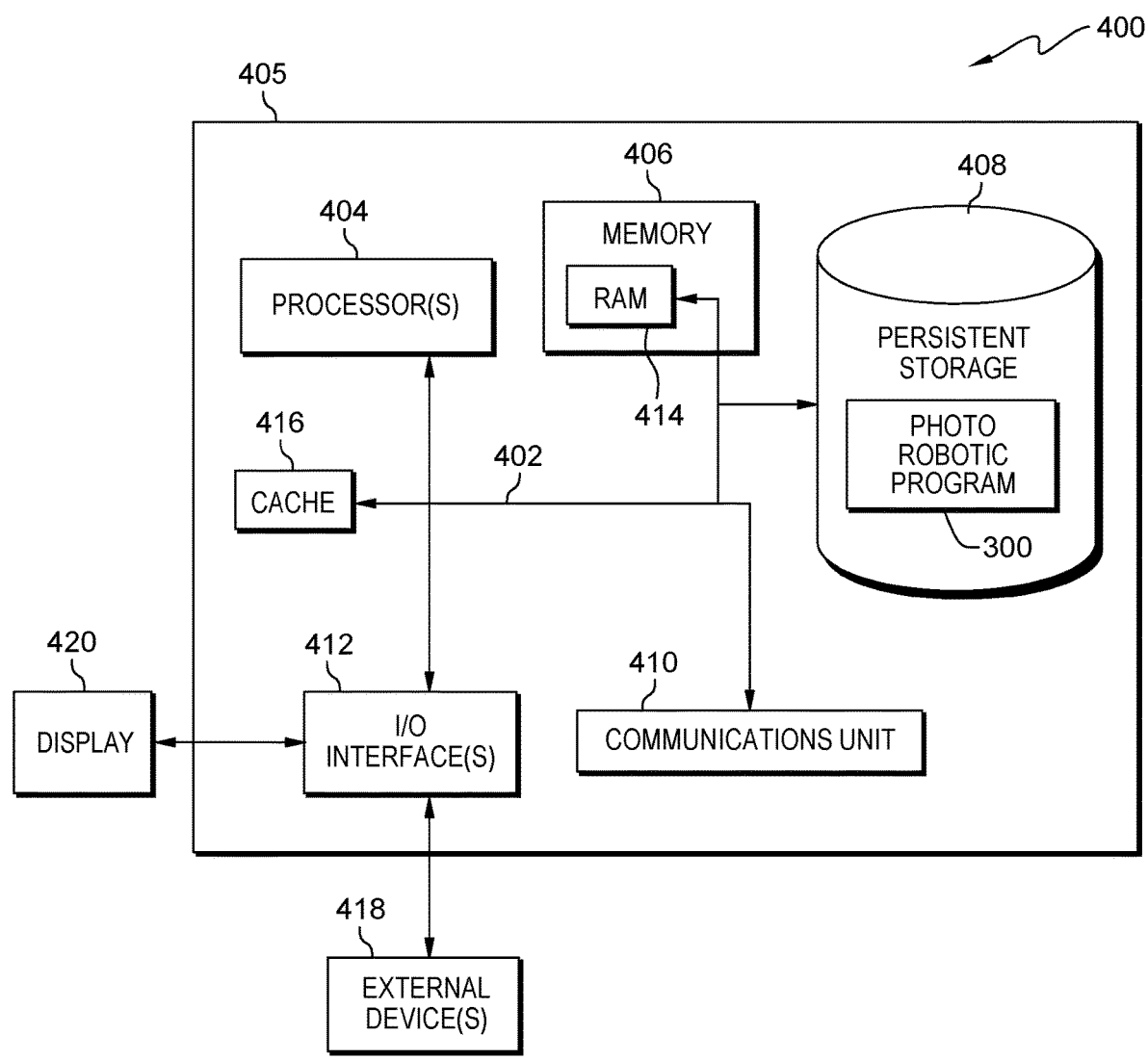
FIG. 4 depicts a block diagram of components of a computing system, including a computing device configured to operationally perform the photo robotic program of FIG. 3, in accordance with an embodiment of the present invention.

FIG. 4 depicts a block diagram of components of a computing system, including computing device 405, configured to include or operationally connect to components depicted in FIG. 1, and with the capability to operationally perform photo-robotic program 300 of FIG. 3, in accordance with an embodiment of the present invention.

Computing device 405 includes components and functional capability similar to components of server 120, (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, an input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406, cache memory 416, and persistent storage 408 are computer-readable storage media. In this embodiment, memory 406 includes random access memory (RAM) 414. In general, memory 406 can include any suitable volatile or non-volatile computer-readable storage media.

In one embodiment, photo robotic program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Photo robotic program 300 may be downloaded to persistent storage 308 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., photo robotic program 300 can be stored on such portable computer-readable storage media and can be loaded onto persistent storage 408 via I/O interface(s) 412. I/O interface(s) 412 also connects to a display 420.

Display 420 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus for three-dimensional (3D) printing of an object, the apparatus comprising:
   a computing device component configured to receive 3D image data from a 3D scan of an object;
   a light-emitting robot having a fluid dynamic shape and constructed, at least in part, with ferrous metal capable of being directed by a magnetic field and material capable of reflecting light or sound waves, wherein the light-emitting robot includes a light source of a wavelength capable of solidifying a photosensitive material, and the light-emitting robot including a power source and control for activating the light source;
   a container of a size and shape to contain the photosensitive material;
   an array of magnetic field generating devices positioned around the container such that one or more of the magnetic devices are activated navigate the light-emitting robot throughout the photosensitive material;
   a controller configured to receive 3D image data from scanning of an object and transpose the 3D image data into an aggregate of pixelated layers, wherein the controller receives position data of the light-emitting robot within the photosensitive material, and activates the array of magnetic field generating devices to navigate the light-emitting robot through the photosensitive material, based on the pixelated layers of the 3D image data, and wherein the controller activates the light source by wireless communication to solidify the photosensitive material corresponding to the pixelated data layers of the 3D image data from the scanning of the object; and
   a monitoring device detecting the relative position of the light-emitting robot within the photosensitive material by sensing reflective waves on three axis and sending the relative position to the controller as feedback for navigation.

2. The apparatus of claim 1, wherein the apparatus monitors the position of the light-emitting robot by sonar using reflection of ultrasonic sound waves.

3. The apparatus of claim 1, wherein the apparatus monitors the position of the light-emitting robot by using a reflection of laser light waves that are of a wavelength that does not affect the photosensitive material.

4. The apparatus of claim 1, operated by performing a computer-implemented method, the method comprising:
   receiving, by one or more processors, three-dimensional (3D) image data of an from a 3D scan of the object;
   transposing, by the one or more processors, the 3D image data into an aggregate of layers of pixelated data;
   receiving, by the one or more processors, an initial position of a light-emitting robot inserted within photosensitive material included in a container;
   communicating, by the one or more processors, with the light-emitting robot by wireless transmissions;
   navigating, by the one or more processors, the light-emitting robot through the photosensitive material, based on the aggregate of layers of the pixelated data of the object scan and feedback of the position of the light-emitting robot within the photosensitive material; and
   activating, by the one or more processors, light emission from the light-emitting robot, based on the wireless communication with the light-emitting robot and a position of the light-emitting robot within the photosensitive material corresponding to the aggregate of layers of pixelated data of the 3D image data, wherein the light emission from the light-emitting robot solidifies the photosensitive material.

5. A computer-implemented method for three-dimensional (3D) printing of an object, the computer-implemented method comprising:
   receiving, by a processor, (3D) image data from a 3D scan of the object;
   transposing, by the processor, the 3D image data into an aggregate of layers of pixelated data;
   receiving, by the processor, an initial position of a light-emitting robot inserted within photosensitive material included in a container;
   communicating, by the processor, with the light-emitting robot by wireless transmission;
   navigating, by the processor, the light-emitting robot through the photosensitive material, based on the aggregate of layers of pixelated data from the 3D scan of the object and feedback of a position of the light-emitting robot within the photosensitive material; and
   activating, by the processor, light emission from the light-emitting robot, based on the wireless communication and the position of the light-emitting robot within the photosensitive material corresponding to the aggregate of layers of pixelated data of the 3D image, wherein activation of the light emission from the light-emitting robot solidifies the photosensitive material.

6. The computer-implemented method of claim 5, further comprising:
   program instructions to control combinations of attributes of the light emission from the light-emitting robot, wherein the attributes of the light emission include combinations selected from the group consisting of focus, intensity, and direction of the light emission; and
   program instructions to control a velocity of the light-emitting robot navigated through the photosensitive material, based on a predetermined property of solidification of the photosensitive material by exposure to the emitted light.

7. The computer-implemented method of claim 5, wherein the light-emitting robot includes a self-contained power supply.

8. The computer-implemented method of claim 5, wherein controlling the navigation of the light-emitting robot through the photosensitive material further comprises:
   program instructions to control generation of a plurality of magnetic fields interacting with magnetic material of the light-emitting robot; and
   program instructions to adjust the generation of the plurality of magnetic fields, based on the 3D image data from the 3D scan of the object.

9. The computer-implemented method of claim 5, wherein activation of the light emission from the light-emitting robot, based on the 3D image data of the object to print, includes controlling a focus of the light emission by an orifice of an array of lights of the light-emitting robot.

10. The computer-implemented method of claim 5, wherein the light emission from the light-emitting robot includes an array of lights at a trail end of the light-emitting robot.

11. The computer-implemented method of claim 5, further comprising:
program instructions to determine a quantity of light-emitting robots to insert into the photosensitive material, based on dimensions and size of the object to print; and
program instructions to generate an instruction regarding placement of the quantity of light-emitting robots into the photosensitive material.

12. The computer-implemented method of claim 5, wherein the navigation of the light-emitting robot is based on a self-contained propulsion device and receipt of wireless control instructions.

13. The computer-implemented method of claim 5, wherein controlling the activation of the light emission from the light-emitting robot, further comprises:
controlling, by the processor, a focus, a direction, and a duration of the light emission.

14. A computer program product for three-dimensional (3D) printing of an object, the computer program product comprising:
at least one computer-readable storage medium;
program instructions stored on the at least one computer-readable storage medium, the program instructions causing a processor(s) set to:
receive 3D image data from a scan of an object to print;
transpose the 3D image data from the scan of the object into an aggregate of layers of pixelated data;
receive an initial position of a light-emitting robot inserted within photosensitive material;
navigate the light-emitting robot through the photosensitive material, based on the aggregate of layers of the pixelated data from the object scan and feedback of a position of the light-emitting robot within the photosensitive material and the 3D image data from the scan of the object to print; and
activate light emission from the light-emitting robot, based on the 3D image data of the object to print, wherein the light emission from the light-emitting robot solidifies the photosensitive material.

15. The computer program product of claim 14, wherein the program instructions to control the navigation of the light-emitting robot through the photosensitive material further cause the processor(s) set to:
control a generation of a plurality of magnetic fields interacting with magnetic material of the light-emitting robot; and
adjust the generation of the plurality of magnetic fields, based on the 3D image data transposed to the aggregate layers of pixelated data of the object to print.

16. The computer program product of claim 14, wherein the program instructions further cause the processor(s) set to:
control attributes of the emitted light of the light-emitting robot, wherein the attributes of the emitted light include combinations selected from the group consisting of focus, intensity, and direction of the emitted light; and
control a velocity of the light-emitting robot navigated through the photosensitive material, based on a predetermined property of solidification of the photosensitive material by exposure to the emitted light.

17. The computer program product of claim 14, wherein the program instructions causing the processor set(s) to:
activate the light emission of the light-emitting robot, based on the 3D image data from the scan of the object to print, further include instructions to control a focus of the light emission by an orifice of an array of lights at a trail end of the light-emitting robot.

18. The computer program product of claim 14, wherein the program instructions further cause the processor(s) set to:
determine a quantity of light-emitting robots to insert into the photosensitive material, based on dimensions and size of the object to print; and
generate an instruction regarding placement of the quantity of light-emitting robots into the photosensitive material.

19. The computer program product of claim 14, wherein the navigation of the light-emitting robot is based on a self-contained propulsion device and receipt of wireless control instructions.

20. The computer program product of claim 14, further comprising:
the processor(s) set, wherein the computer program product is a computer system.

* * * * *